US011840873B2

(12) United States Patent
Gubesch et al.

(10) Patent No.: US 11,840,873 B2
(45) Date of Patent: Dec. 12, 2023

(54) CLOSING DEVICE FOR A VEHICLE

(71) Applicant: Continental Automotive GmbH, Hannover (DE)

(72) Inventors: Peter Gubesch, Vienna (AT); Andreas Egger, Groß-Enzersdorf (AT); Stefan Ehrlich, Vienna (AT); Roland Enzlmüller, Vienna (AT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1092 days.

(21) Appl. No.: 16/561,278

(22) Filed: Sep. 5, 2019

(65) Prior Publication Data
US 2020/0123833 A1 Apr. 23, 2020

(30) Foreign Application Priority Data
Sep. 12, 2018 (DE) ..................... 10 2018 215 520.8

(51) Int. Cl.
*E05F 15/40* (2015.01)
*B60J 7/043* (2006.01)
(Continued)

(52) U.S. Cl.
CPC ............. *E05F 15/40* (2015.01); *B60J 7/0435* (2013.01); *B60R 21/02* (2013.01); *E05F 1/06* (2013.01); *B60R 2021/0253* (2013.01)

(58) Field of Classification Search
CPC ..... E05F 15/00; E05F 15/40; E05F 15/41–43; E05F 15/431; E05F 1/00; E05F 1/16;
(Continued)

(56) References Cited

U.S. PATENT DOCUMENTS 6,150,785 A 11/2000 Butscher et al.
6,870,339 B2 3/2005 Kessler et al.
(Continued)

FOREIGN PATENT DOCUMENTS

CN 202145167 U 2/2012
CN 103144520 A 6/2013
(Continued)

OTHER PUBLICATIONS

German Examination Report for German Application No. 10 2018 215 520.8, with partial translation, dated Aug. 27, 2019—5 pages.
(Continued)

*Primary Examiner* — Nathan Cumar
(74) *Attorney, Agent, or Firm* — RatnerPrestia

(57) ABSTRACT

A closing device for opening and closing an opening in a vehicle is disclosed. The closing device comprises a closing system, having a closing body (SK) that is fitted on the vehicle (FZ) in a movable manner and is configured to open and close the opening (O), a drive device (AV) that is operatively connected to the closing body (SK) and is configured to move the closing body (SK), and a transmission system (US) that is arranged between the closing body (SK) and the drive device (AV) and is configured to transmit a drive force generated by the drive device (AV) to the closing body (SK). The closing system (SLS) has a closing system spring rate (FRSLS) that characterizes an overall elasticity of the closing body (SLS), of the drive device (AV) and of the transmission system (US). The closing device (SV) also comprises a force transmission spring unit (KUFE) that is configured to pick up the drive force transmitted from the drive device (AV) to the closing body (SK). The force transmission spring unit (KUFE) has a force transmission spring rate (FRKUFE) that is lower than the closing system spring rate (FRSLS).

15 Claims, 4 Drawing Sheets

(51) Int. Cl.
*B60R 21/02* (2006.01)
*E05F 1/16* (2006.01)
*E05F 1/06* (2006.01)

(58) Field of Classification Search
CPC ....... B60J 7/00; B60J 7/04; B60J 7/043; B60J 7/0435; B60J 7/047; B60J 7/05; B60J 7/053; B60R 21/00; B60R 21/02; B60R 2021/0253
USPC .......................................................... 292/69
See application file for complete search history.

(56) References Cited

U.S. PATENT DOCUMENTS

| | | | |
|---|---|---|---|
| 8,198,849 B2 | 6/2012 | Lamm | |
| 2002/0117876 A1* | 8/2002 | Sakai | B60J 7/22 |
| | | | 296/217 |
| 2002/0117983 A1* | 8/2002 | Nagashima | B60J 7/0573 |
| | | | 318/280 |

FOREIGN PATENT DOCUMENTS

| | | |
|---|---|---|
| EP | 1299782 B1 | 9/2005 |
| EP | 0910883 B1 | 12/2006 |
| EP | 2044283 B1 | 4/2013 |
| JP | 06253570 A | 9/1994 |
| JP | 5791273 B2 | 10/2015 |
| WO | 9801645 A1 | 1/1998 |

OTHER PUBLICATIONS

Chinese Office Action for Chinese Application No. 201910864465.4, dated Dec. 1, 2020, with partial translation, 14 pages.

* cited by examiner

CLOSING DEVICE FOR A VEHICLE

CROSS REFERENCE TO RELATED APPLICATIONS

This application claims priority to German Patent Application No. 10 2018 215 520.8, filed Sep. 12, 2018, the contents of such application being incorporated by reference herein.

FIELD OF THE INVENTION

The present invention relates to a closing device, in particular a power-operated closing device, for opening and closing an opening in a vehicle.

BACKGROUND OF THE INVENTION

In vehicle construction or automotive engineering, closing devices are used inter alia as power-operated window lifters, as power-operated sunroof drives, as power-operated door or tailgate drives, or as power-operated partitions. The closing systems move a closing body in order to close an opening in the vehicle. The closing body is driven for example via an electric motor, which, by means of a corresponding transmission device, for example a guide formed on or in the opening, transmits a force acting on the closing body in order to open and close the opening.

The zone between an open position of the closing body, in which the opening is as accessible as possible, and the closed position of the closing body, in which the opening is closed entirely or as much as possible, is usually denoted closing zone.

In order to avoid injuries to people as a result of parts of the body being trapped in the closing zone of the opening, suitable safety systems should be provided on the power-operated closing device, which, in a hazardous situation, stop or reverse the closing operation or sufficiently reduce the force acting on the closing body.

In principle, the safety systems can be subdivided into two categories: directly measuring safety systems and indirectly measuring safety systems. Directly measuring safety systems check for the presence of objects in the closing zone by means of suitable sensors. Indirectly measuring safety systems infer the presence of an object in the closing zone on the basis of feedback on the drive of the closing body.

With a suitable design, directly measuring safety systems provide a very high degree of safety, but are relatively complicated and thus also costly to implement.

By contrast, indirectly measuring safety systems are usually relatively inexpensive. A drawback with such systems, however, is that it is not always possible to reliably identify from the feedback of the movement of a closing body on the drive whether a foreign object (also known as trapped object) is actually trapped in the closing zone. Among other things, this is because the forces to be applied during the movement of the closing body depend on a large number of factors (for example mechanical play, temperature, wear, etc.) and therefore the feedback of the movement of the closing body on the drive does not always make it possible to unambiguously infer that a trapped object is in the closing zone.

This is particularly problematic when the closing of the closing body is effected without visual contact on the part of the operator and thus there is no monitoring of the possible trapping of foreign bodies in the closing zone. This is the case in particular when the closing system is activated via remote control, but also when closing operations are activated automatically by automatic systems, for example rain sensors.

SUMMARY OF THE INVENTION

Therefore, an aspect of the present invention is a closing system, in particular a power-operated closing system, that is cost-effective and yet ensures anti-trap protection that works reliably and safely.

The closing device according to an aspect of the invention for opening and closing an opening in a vehicle (or in a vehicle frame of the vehicle) comprises a closing system, having a closing body that is fitted in the vehicle in a movable manner and is configured to open and close the opening, a drive device that is operatively connected to the closing body and is configured to move the closing body, and a transmission system that is arranged between the closing body and the drive device and is configured to transmit a drive force generated by the drive device to the closing body. Here, the closing system has a closing system spring rate that characterizes an overall elasticity of the transmission system, of the closing body and of the drive device. The elasticity of the transmission system, of the closing body and of the drive device results for example from mechanical or dynamic force transmission processes, from mechanical play in the transmission system, from an elastic seal in the region of the transmission system or of the closing body, from elasticity of the closing body itself, from the transmission system itself, which is realized for example via a cable pull, via a Bowden cable or the like, from running rails or guides of the transmission system, from a driveshaft of the drive device, from mutual engagement of pinions and gear wheels in the drive device and/or the transmission system and the play associated therewith, or other effects. The closing system spring rate combines all of these factors and reproduces so to speak the overall elasticity of the closing body, of the drive device and of the transmission system in the form of a spring rate, which is also referred to as spring constant or spring stiffness.

In addition to the closing system, which has the described closing system spring rate, the closing device according to an aspect of the invention has an additional and separate force transmission spring unit. This force transmission spring unit is configured to pick up the drive force transmitted from the drive device to the closing body. As a result, the force transmission spring unit can pick up the drive force generated by the drive device and serve so to speak as a force sensor or clamping force sensor. According to an aspect of the invention, the force transmission spring unit is selected such that the force transmission spring unit has a force transmission spring rate that is lower than the closing system spring rate.

An aspect of the invention is based on the finding that, in many countries, there are regulations that prescribe a maximum permissible clamping force to be observed under all boundary conditions. Particular clamping forces must not be exceeded in particular for a critical zone in which the residual opening that remains in the closing direction on account of incomplete covering of the opening by the closing body is less than or equal to a predetermined threshold value. For example, section S5 of the standard FMVSS118 valid in the United States of America specifies a maximum permissible clamping force for a particular critical residual opening in the case of a test body with a spring rate of 65 N/mm. With such hard test bodies or clamping bodies, a high clamping force is already developed within very short travels. At the same time, the clamping force must not exceed 100 N, however. Thus, if, in such a case, there is a small distance between the trapped object and the closing body, relatively little travel (approximately 1.5 mm) or little time remains in order to stop or reverse the closing body in good time and to avoid damage to the trapped object.

At the same time, however, it was found that the components of the closing system (closing body, drive device and transmission system) themselves have relatively high spring rates. As a result, the closing system as a whole also has a relatively high closing system spring rate. If a clamping body having a spring rate of 65 N/mm is now used to detect the clamping force, as demanded in section S5 of the standard FMVSS118, this has the result that a trapped object cannot always be detected reliably and safely in the predetermined short time or in the predetermined short travel of about 1.5 mm. In other words, it is possible for a clamping force of more than 100 N to act on the trapped object before the trapping incident is identified. This is a problem.

Therefore, an aspect of the invention is also based on the finding that when an additional distinctive spring (force transmission spring unit) is installed, the spring rate of which is lower than the closing system spring rate, the overall spring rate, resulting from the closing system spring rate and the force transmission spring rate, of the closing device depends substantially on the spring rate of the additional force transmission spring unit. Therefore, if the closing device has an additional force transmission spring unit that has a lower spring rate than the closing system spring rate, the overall spring rate of the closing device becomes lower and as a result there is more time or more travel available to be able to react to a trapped object in the closing zone (before the regulatory clamping force of 100 N is reached).

The expression "spring rate" relates here to the spring rate in the direction of the applied (drive) force of the drive device. In other words, the force transmission spring rate in the direction of the applied drive force is lower than the closing system spring rate in the direction of the applied drive force.

According to a particularly preferred configuration, the force transmission spring unit is arranged between the closing body and the transmission system. In this arrangement, greater sensitivity in the detection of the trapped object is achieved, since the force is picked up immediately behind the closing body.

Alternatively, the closing device has a vehicle frame that has the opening to be opened and closed, and the force transmission spring unit is arranged between the closing body and the vehicle frame. The force transmission spring unit can be arranged on the closing body so as to produce a closing body—force transmission spring unit—trapped object—vehicle frame arrangement. However, the force transmission spring unit can also be arranged on the vehicle frame so as to produce a closing body—trapped object—force transmission spring unit—vehicle frame arrangement. In both cases, the force transmission spring unit is arranged between the closing body and the vehicle frame. This results in particularly high sensitivity in the detection of the trapped object, since the force transmission spring unit is arranged immediately next to the trapped object.

According to a further configuration, the force transmission spring unit is connected in series with the closing body, the drive device, the transmission system and optionally with the vehicle frame. This configuration results in the overall spring rate on account of a series connection of the closing system spring rate and force transmission spring rate. The overall spring rate therefore has a value that is lower than the lowest spring rate in the system. Thus, the overall spring rate is lower (i.e. softer) than the force transmission spring rate, since the latter for its part is lower than the closing system spring rate. According to a preferred configuration, the closing system spring rate has a closing system spring rate tolerance range, and the force transmission spring rate has a force transmission spring rate tolerance range.

The expression "tolerance range" in this case encompasses fluctuations in the elasticity or spring rate of the particular component. These result for example from temperature influences, aging effects, installation position and/or deviations in series production of the particular component, the material of the particular component, reproducibility when the particular component is subjected to force, etc. The tolerance range in this case indicates an upward and downward deviation from the particular spring rate. If, for example, the force transmission spring rate has a value of 20 N/mm and a tolerance range of 20%, the force transmission spring rate can fluctuate in a range from 16 N/mm to 24 N/mm.

According to the preferred configuration, at a predetermined force transmission spring rate, the force transmission spring rate tolerance range is furthermore selected such that the overall spring rate resulting from the closing system spring rate and the force transmission spring rate has an overall spring rate tolerance range of no more than ±30%. As a result of this configuration, it is possible for example for a force transmission spring unit to be selected that has a low spring rate but a large tolerance range. In other words, it is possible either to choose a softer force transmission spring unit, which has a larger tolerance range, or to choose a harder force transmission spring unit, which has a smaller tolerance range. As a result, it is also possible to use a force transmission spring unit having a larger tolerance range, as long as the force transmission spring rate is then chosen to be small enough. This can represent a cost-effective alternative under certain circumstances.

According to a further configuration, the force transmission spring rate is selected such that an overall spring rate resulting from the closing system spring rate and the force transmission spring rate is at most 20 N/mm. A value of 20 N/mm has been found to be particularly advantageous since, as a result, reliable anti-trap protection can be ensured for a comparatively large number of different closing system spring rates.

According to a further configuration, the force transmission spring rate is lower than 65 N/mm. A value of less than 65 N/mm is appropriate because, as a result, the force transmission spring unit is softer than the clamping body according to section S5 of FMVSS118.

According to a particularly preferred configuration, the force transmission spring rate is in a range from 2 N/mm to 25 N/mm, preferably in a range from 5 N/mm to 25 N/mm, more preferably in a range from 10 N/mm to 25 N/mm. A value of less than 2 N/mm, preferably less than 5 N/mm, more preferably less than 10 N/mm, has been found to be disadvantageous, since the force transmission spring unit could then be too soft and as a result the closing body could experience undesired fluctuating movements under certain circumstances. A value of greater than 25 N/mm has been found to be disadvantageous, since the overall spring rate of at most 20 N/mm may then no longer be achieved under certain circumstances.

According to a further configuration, the force transmission spring unit is selected such that the force transmission spring unit has a maximum linear elastic deformation at a force of 100 N plus a frictional force that arises in the closing system. The maximum linear elastic deformation in this case means the maximum linear deformation that the force transmission spring unit undergoes through compression or expansion without the force transmission spring unit being subject to plastic deformation or without an end of the spring travel being achieved. In other words, in this configuration, the force transmission spring unit is selected such that the force transmission spring unit can absorb at most a force of 100 N plus a frictional force that arises in the closing system in the elastic deformation range. Thus, if such a force transmission spring unit were to be exposed to a force of 150 N, it would plastically deform in addition to the elastic deformation. It would therefore not be possible to pick up the additional 50 N as spring force. Since 100 N is the legally maximum permissible clamping force, it is thus possible for a relatively small or relatively short spring to be used as force transmission spring unit.

According to a preferred configuration, the force transmission spring unit is selected such that the maximum linear elastic deformation is already achieved at the value of 60% to 80% of 100 N. In this configuration, a safety buffer is included in the selection of the force transmission spring unit, this taking for example material aging, temperature influences etc. on the force transmission spring unit into consideration.

According to a further configuration, the force transmission spring unit exhibits a metal material or a fiber composite material. The metal material or the fiber composite material results in particularly good reproducibility and continuous-running integrity of the force transmission spring unit.

According to a further configuration, the force transmission spring unit has a wire. The term "wire" in this case denotes a body having a much longer direction of longitudinal extension than its direction of transverse extension. The term "wire" therefore also encompasses for example a bow. As a result of this configuration, a relatively simple and cost-effective force transmission spring unit can be used.

According to a preferred configuration, the wire is a coiled wire. In this configuration, the force transmission spring unit is particularly compact and as a result requires very little installation space.

According to a further configuration, the force transmission spring unit is configured to pick up the drive force both in a first force application direction and in a second force application direction that is at an angle (i.e. not parallel) to the first force application direction. The force application direction is in this case the direction in which the drive force acts on the force transmission spring unit. For example, a first force application direction could be a push/pull direction when for example the closing body is a sunroof and the sunroof is moved horizontally. A second force application direction can be for example shear or torsion, which extends at an angle to the push/pull direction and occurs for example when the sunroof is tilted. In this way, it is possible with a single force transmission spring unit to pick up the drive forces of several operating modes (movement in translation and tilting) of the closing body. As a result, anti-trap protection becomes even more effective, since several operating modes (movement in translation and tilting) can be monitored.

However, alternatively or additionally, it is also possible for the force transmission spring unit to have a first force transmission spring that picks up the drive force in a first operating mode (for example movement in translation), and to have at least one further force transmission spring that picks up the drive force in a further operating mode (for example tilting). In this configuration, the force transmission spring unit has a force transmission spring configured for each particular operating mode. As a result, the accuracy of anti-trap protection can be increased for the different operating modes.

BRIEF DESCRIPTION OF THE DRAWINGS

Exemplary embodiments of aspects of the invention are explained in more detail below with reference to schematic drawings.

In the drawings.

In the drawings, identical or functionally identical elements are provided with the same reference signs.

DETAILED DESCRIPTION OF THE PREFERRED EMBODIMENTS

Figure 1:
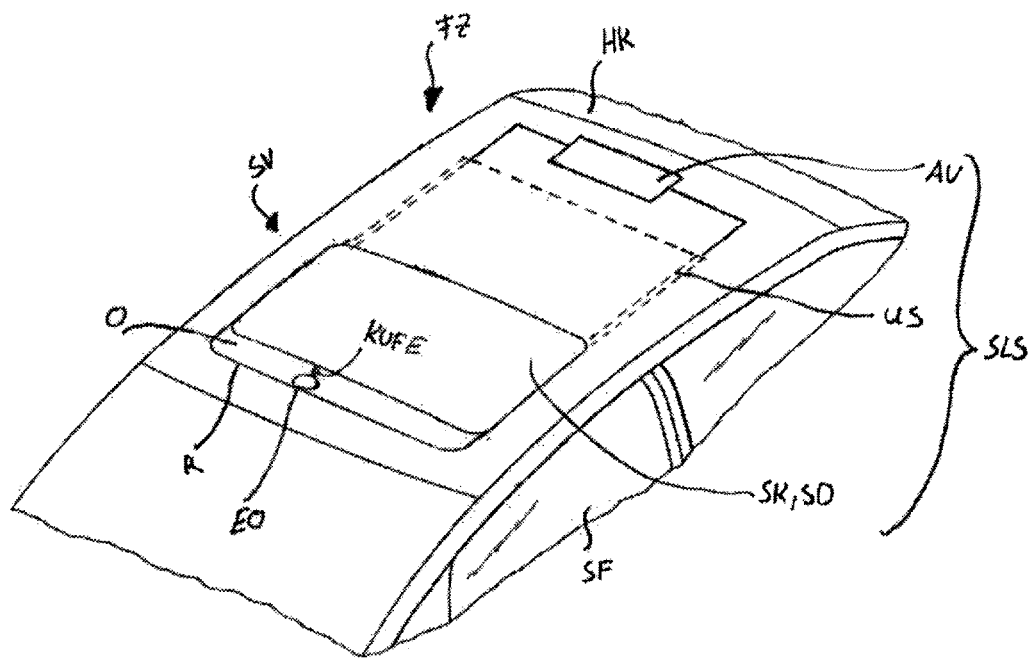
FIG. 1 shows a schematic view of a closing device according to an aspect of the invention for opening and closing an opening in a vehicle.

Reference is first made to FIG. 1, which shows a vehicle FZ having a closing device SV for opening and closing an opening O in the vehicle FZ. The opening O is in this case formed in a vehicle frame R of the vehicle FZ. In the specific example in FIG. 1, the opening O is formed in a roof frame (roof panel) of the vehicle FZ and the closing device SV is a sunroof closing device. Of course, the closing device SV can open or close other openings in other exemplary embodiments, for example an opening in a side window region SF of the vehicle FZ, an opening in a tailgate region HK of the vehicle FZ, an opening in a door region of the vehicle FZ, or an opening in a partition region of the vehicle FZ.

The closing device SV comprises a closing body SK (shown here for example as a sunroof SD), which is configured to open and close the opening O in the vehicle frame R of the vehicle FZ. The closing device also comprises a drive device AV, which may be for example an electromotive drive or an electric motor. The drive device AV is operatively connected to the closing body SK and serves to move the closing body SK. The closing device SV also comprises a transmission system US, which is arranged between the closing body SK and the drive device AV. The transmission system US serves to transmit a drive force generated by the drive device AV to the closing body SK such that the closing body can open or close the opening O. The transmission system US can have for example guides, rails, cable pulls or Bowden cables.

Figure 2:
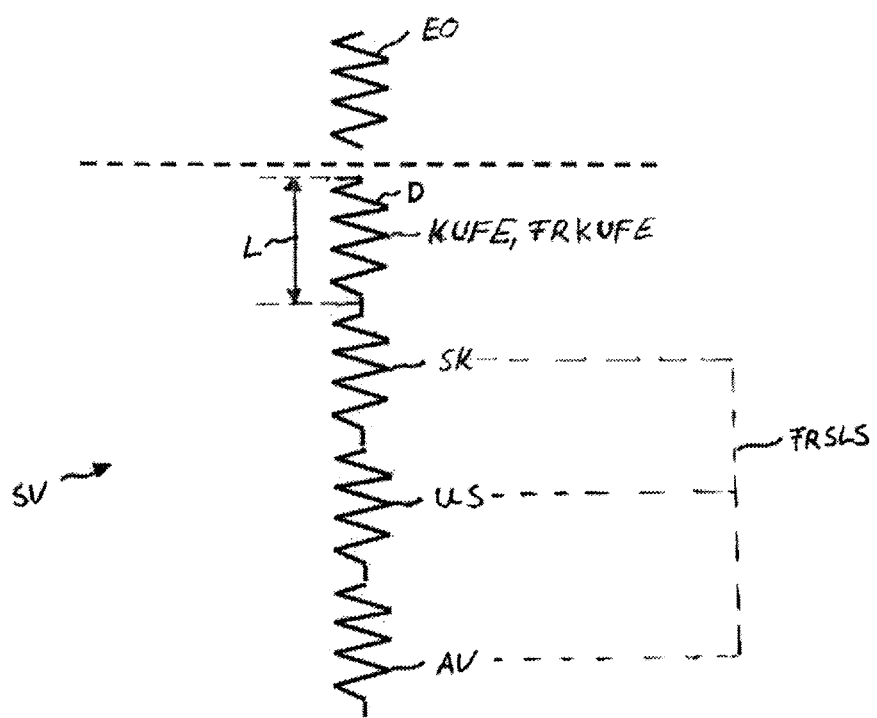
FIG. 2 shows a schematic basic diagram of the closing device in FIG. 1, in which components of the closing device and a trapped object in the closing zone of the closing device are illustrated in a model-like manner as mechanical springs.

The closing body SK, the transmission system US and the drive device AV in this case form a closing system SLS, which is described in more detail in conjunction with FIG. 2.

In addition to the closing system SLS, the closing device SV has a force transmission spring unit KUFE, which can pick up the drive force transmitted from the drive device AV to the closing body SK, this being described in more detail in conjunction with FIG. 2. In the specific example in FIG. 1, the force transmission spring unit KUFE is arranged between the vehicle frame R and the closing body SK. The force transmission spring unit KUFE can be arranged on the closing body SK or on the vehicle frame R.

As is also shown in FIG. 1, the opening has a trapped object EO. The trapped object EO is an example of a foreign object located in the closing zone of the opening O. This can be for example a body part of a person who is in the vicinity of the vehicle FZ.

If, as is shown in the specific example in FIG. 1, the force transmission spring unit KUFE is arranged between the vehicle frame R and the closing body SK, in a trapping incident, the trapped object EO is thus trapped between the vehicle frame R and the force transmission spring unit KUFE with the result that the drive force transmitted to the closing body SK (said drive force corresponding approximately to the clamping force acting on the trapped object EO) is picked up.

The closing device SV according to an aspect of the invention is specifically configured such that a clamping force applied to the trapped object EO by the closing body SK does not exceed a predetermined threshold value. In particular, the closing device SV is configured such that the clamping force that acts on the trapped object EO does not exceed the 100 N demanded in section S5 of FMVSS118.

Reference is now made to FIG. 2, which shows a schematic basic diagram of the closing device SV in FIG. 1, wherein the individual components of the closing device and also the trapped object EO are illustrated in a model-like manner as mechanical springs.

As can be seen, the closing body SK, the transmission system US and the drive device AV are each illustrated as springs connected in series. Each of these springs characterizes an elasticity associated with the corresponding component. For example, the closing body SK can have a seal that has a certain elasticity. It is also possible for the closing body SK itself to have a certain elasticity because it exhibits for example a degree of play in a guide that is part of the transmission system US. Furthermore, the transmission system US for its part has a certain elasticity because the transmission system US works for example with the aid of cable pulls and/or Bowden cables, which for their part have a certain elasticity. It is also possible for the guide rails of the transmission system US to have a degree of play and thus a certain elasticity. And finally, the drive device AV also has a certain elasticity, since the drive device AV has for example a driveshaft that transmits the drive force to the closing body SK via a pinion and a gear wheel. The mutual engagement of pinions and gear wheels also results in a degree of slip and thus in a certain elasticity. All of these factors are depicted in a model-like manner by the respective springs SK, US, AV. Since this is a model, it is of course also possible for the elasticity of the closing body SK, transmission system US and drive device AV to be able to be depicted in some other way. For example, it is conceivable for the elasticity of these three components to be depicted by means of two springs such that a first spring depicts the static forces and the elasticity associated therewith, and a second spring depicts the dynamic forces and the elasticity associated therewith. It is also conceivable for an elasticity of the vehicle frame R (not illustrated) to also be taken into consideration.

The closing system spring rate FRSLS can either be measured or estimated via modeling or calculation, in particular mechanical calculation.

As is shown in FIG. 2, the trapped object EO is also illustrated in a model-like manner as a spring. The spring rate of the trapped object EO has for example a spring rate of 65 N/mm according to section S5 of FMVSS118.

As already mentioned above, the closing body SK, the transmission system US and the drive device AV form the closing system SLS. Since the three components are connected in series, this thus results in a closing system spring rate FRSLS that results from the sum of the reciprocal values of the individual spring rates of the respective components SK, US, AV, as is known to a person skilled in the art for series connections of springs. If the elasticity of the vehicle frame R is also intended to be taken into consideration, this can in turn take place via a series-connected spring with a corresponding spring rate.

The closing device SV according to an aspect of the invention is thus distinguished by the fact that it has an additional force transmission spring unit KUFE. The additional force transmission spring unit KUFE can, for its part, be illustrated in turn as a spring or actually be a spring in a real installation, said spring for its part having a force transmission spring rate FRKUFE.

In the specific example in FIG. 2, the force transmission spring unit KUFE is arranged on the closing body SK. As already mentioned above, the force transmission spring unit KUFE can also be arranged on the vehicle frame R, however.

Figure 3:
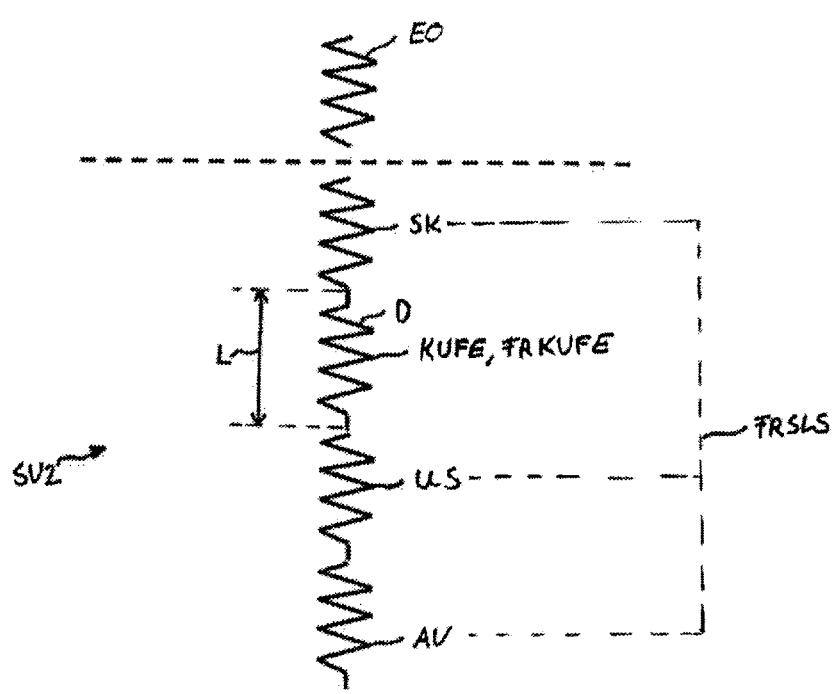
FIG. 3 shows a schematic basic diagram of a further exemplary embodiment of a closing device according to an aspect of the invention.

Alternatively, it is also possible for the force transmission spring unit KUFE to be arranged between the closing body SK and the transmission unit US. In this regard, reference is made for example to FIG. 3, which shows a further embodiment of a closing device SV2, in which the force transmission spring unit KUFE is arranged between the closing body SK and the transmission unit US. It would also be possible to arrange the force transmission spring unit KUFE between the transmission system US and the drive device AV.

In all these cases, the force transmission spring unit KUFE is arranged in series with the closing system SLS. Since the force transmission spring unit KUFE is arranged in series with the closing system SLS, the following arises for an overall spring rate FRGES of the closing device SV:

$$\frac{1}{FRGES} = \frac{1}{FRKUFE} + \frac{1}{FRSLS} \quad (1)$$

The force transmission spring unit KUFE is thus chosen such that the force transmission spring rate FRKUFE is lower than the closing system spring rate FRSLS of the closing system SLS. This has the result that the overall spring rate FRGES is substantially dependent on the lowest spring rate of the system and thus on the force transmission spring rate FRKUFE. As a result of the choice of the force transmission spring rate FRKUFE, it is thus possible for the overall spring rate FRGES of the closing device SV to be set such that, even in the case of a relatively hard clamping body with a spring rate of 65 N/mm, a sufficiently large travel of the closing body SK exists in order for it to be possible to detect a trapping incident without the clamping force acting on the trapped object EO exceeding the 100 N prescribed by the regulations.

Mathematical calculations have shown that, in different closing systems, which for their part can have different closing system spring rates, with an overall spring rate FRGES of at most 20 N/mm, reliable anti-trap protection can be ensured for a relatively large number of different closing devices. Similarly, mathematical calculations have shown that reliable anti-trap protection can be ensured in the case of a force transmission spring rate FRKUFE in a range from 2 N/mm to 25 N/mm, preferably 5 N/mm to 25 N/mm, more preferably 10 N/mm to 25 N/mm.

In addition, it has been found that a length L of the force transmission spring unit KUFE can be chosen such that the force transmission spring unit KUFE has a maximum linear elastic deformation at a force of 100 N plus a frictional force that arises in the closing system SLS. This means that the length L of the force transmission spring unit KUFE only has to be large enough for the force transmission spring unit KUFE to have to be able to absorb, in the elastic deformation range, a maximum spring force of the statutory 100 N plus a frictional force that arises in the closing system SLS. If a force transmission spring unit KUFE having a force transmission spring rate FRKUFE of 10 N/mm were to be used, a length of somewhat more than 10 mm would already be enough for it to be possible to absorb the 100 N/mm plus the frictional forces that arise in the closing system SLS in the elastic deformation range.

As is shown in the specific example in FIG. 2, the force transmission spring unit KUFE can be configured as a wire D, in particular as a coiled wire. Particularly preferably, the force transmission spring unit KUFE consists of a metal material or a fiber composite material, since in this case the properties with respect to possible temperature influences and continuous-running integrity are particularly good.

An additional aspect in the choice of the force transmission spring unit will now be discussed, which can be described using the term "tolerance" or "fluctuation".

It is known that a spring does not have a fixed spring rate but rather that even this fixed spring rate can fluctuate in a small range. These fluctuations in the spring rate exist for example on account of temperature influences on the spring, because of aging effects, deviations in series production of the spring, material defects or repeated compression and expansion of the spring. All of these effects together mean that the actual spring rate of the spring fluctuates by a spring rate value. These fluctuations can be referred to as tolerance range of the spring rate.

Consequently, the closing system spring rate FRSLS of the closing system also does not have a fixed value, but rather can have a closing system spring rate tolerance range TSLS. Similarly, the force transmission spring rate FRKUFE can have a force transmission spring rate tolerance range TKUFE. If, in the design of the force transmission spring unit KUFE, the closing system spring rate tolerance range TSLS and the force transmission spring rate tolerance range TKUFE are also taken into consideration, it has been shown that, at a given force transmission spring rate FRKUFE and at a given closing system spring rate FRSLS with a given closing system spring rate tolerance range TSLS, the force transmission spring rate tolerance range TKUFE can be chosen such that the overall spring rate FRGES that results from the closing system spring rate FRSLS subject to tolerances and the force transmission spring rate FRKUFE subject to tolerances is not intended to exceed an overall spring rate tolerance range TGES of 30%, in order to ensure anti-trap protection that is as good as possible.

This is explained in more detail with reference to two examples.

Example 1

|  | Min. spring rate | TR minus | Mean spring rate | TR plus | Max. spring rate |
| --- | --- | --- | --- | --- | --- |
| SLS | 20 N/mm | −42.86% | 35 N/mm | +42.86% | 50 N/mm |
| KUFE | 16 N/mm | −20% | 20 N/mm | +20% | 24 N/mm |
| GES | 8.9 N/mm | −29.19% | 12.6 N/mm | +29.19% | 16.2 N/mm |

In example 1, the closing system SLS has for example a closing system spring rate FRSLS of 35 N/mm with a closing system spring rate tolerance range TSLS of 42.86%. Thus, the closing system spring rate fluctuates (for example on account of the above-described effects) between a value of 20 N/mm and 50 N/mm. Furthermore, in the closing system SLS, a force transmission spring unit KUFE having a force transmission spring rate FRKUFE of 20 N/mm was arranged. If the force transmission spring rate FRKUFE has a force transmission spring rate tolerance range TKUFE of 20%, the force transmission spring rate FRKUFE fluctuates (for example on account of the above-described effects) between a value of 16 N/mm and 24 N/mm. The resultant overall spring rate FRGES then results according to equation (1) as 12.6 N/mm with an overall spring rate tolerance range of 29.19%.

According to example 1, it is thus possible, at a given closing system spring rate of 35 N/mm and a given closing system spring rate tolerance range TSLS of 42.86%, for a force transmission spring unit KUFE having a force transmission spring rate FRKUFE of 20 N/mm and a force transmission spring rate tolerance range of 20% to be chosen without the overall spring rate tolerance range TGES of the overall spring rate FRGES exceeding 30%.

Example 2

|  | Min. spring rate | TR minus | Mean spring rate | TR plus | Max. spring rate |
| --- | --- | --- | --- | --- | --- |
| SLS | 20 N/mm | −42.86% | 35 N/mm | +42.86% | 50 N/mm |
| KUFE | 7.5 N/mm | −25% | 10 N/mm | +25% | 12.5 N/mm |
| GES | 5.5 N/mm | −29.41% | 7.7 N/mm | +29.41% | 10.0 N/mm |

In example 2, the closing system SLS has the same closing system spring rate FRSLS of 35 N/mm with the same closing system spring rate tolerance range TSLS of 42.86%. However, in contrast to example 1, a force transmission spring unit KUFE having a force transmission spring rate FRKUFE of 10 N/mm was chosen. As a result, the force transmission spring rate tolerance range TKUFE can rise to up to 25% without the resultant overall spring rate FRGES having an overall spring rate tolerance range TGES that exceeds 30%.

Thus, in example 2, a force transmission spring unit KUFE that is softer than in example 1 was chosen. At the same time, however, a greater force transmission spring rate tolerance range TKUFE could be chosen for this softer force transmission spring unit KUFE without the resultant overall spring rate FRGES having an overall spring rate tolerance range TGES of more than 30%. As a result of the choice of a softer force transmission spring unit KUFE, it is thus possible for a force transmission spring unit KUFE having a larger force transmission spring rate tolerance range TKUFE to be chosen. This can be a cost-effective alternative to a force transmission spring unit KUFE that is hard but is subject to a low tolerance.

Figure 4:
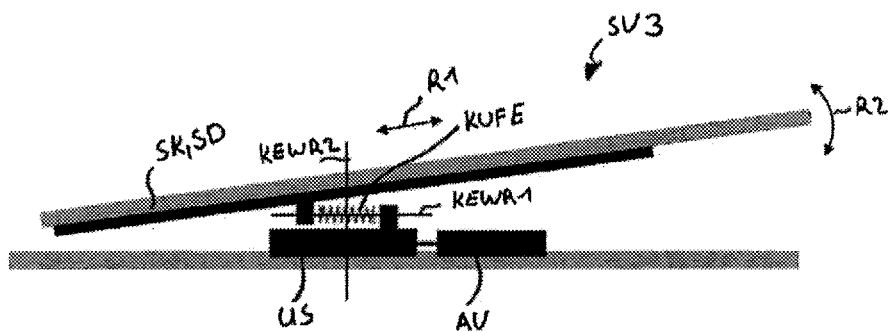
FIG. 4 shows a schematic view of a further exemplary embodiment of a closing device according to an aspect of the invention, in which the force transmission spring unit has two force application directions.

Reference is now made to FIG. 4, which shows a further exemplary embodiment of a closing device SV3.

In the specific example in FIG. 4, the closing body SK is again shown by way of example as a sunroof SD. The closing body SK has a first operating mode, which can be referred to as translation mode, in which the closing body SK is moved along the arrow R1. The closing body SK also has a second operating mode, which can be referred to as tilting mode, in which the closing body is moved along the arrow R2.

The exemplary embodiment in FIG. 4 is distinguished by the fact that the force transmission spring unit KUFE can pick up or absorb a drive force of the drive device AV both in a first force application direction KEWR1 and in a second force application direction KEWR2 that is at an angle (not parallel) to the first force application direction KEWR1. The first force application direction KEWR1 is for example the direction in which the drive force of the drive device AV acts in order that the closing body SK moves along the arrow R1, that is to say in the translation mode. The second force application direction KEWR2 is for example the direction in which the drive force of the drive device AV acts in order that the closing body SK moves along the arrow R2, that is to say in the tilting mode. If the drive force acts in the direction of the first force application direction KEWR1, the force transmission spring unit KUFE can pick up this drive force for example in the push/pull direction of the force transmission spring unit KUFE. If the drive force acts in the direction of the second force application direction KEWR2, the force transmission spring unit KUFE can pick up this drive force for example in the shear or torsion direction of the force transmission spring unit KUFE. Since the force transmission spring unit KUFE can pick up the drive force of the drive device AV in two different force application directions KEWR1, KEWR2, it is possible to ensure effective anti-trap protection for two operating modes of the closing body SK with a single force transmission spring unit KUFE. As can be seen in FIG. 4, the force application direction KEWR1, KEWR2 does not absolutely have to be the same direction as the direction of the operating mode (sliding mode or tilting mode).

Figure 5:
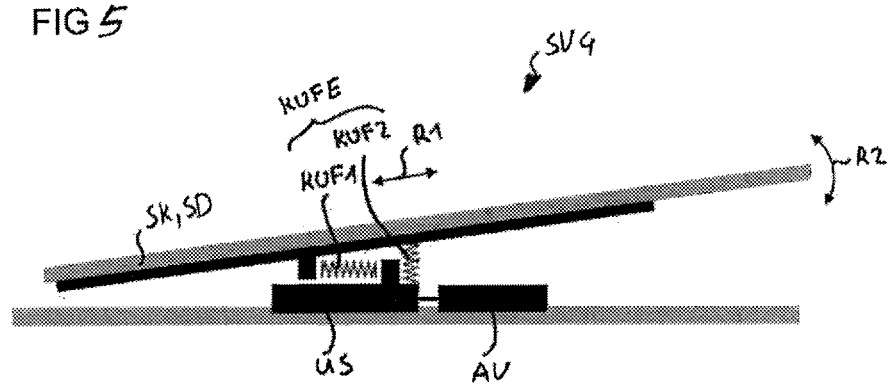
FIG. 5 shows a schematic view of a further exemplary embodiment of a closing device according to an aspect of the invention, in which the force transmission spring unit has a plurality of force transmission springs, which are each assigned to one operating mode of the closing body.

Reference is now made to FIG. 5, which shows a further exemplary embodiment of a closing device SV4 according to an aspect of the invention.

As in FIG. 4, in FIG. 5, the sliding body SK is shown for example as a sunroof SD, which can be operated in a translation mode (along the arrow R1) and in a tilting mode (along the arrow R2).

In contrast to the exemplary embodiment in FIG. 4, the force transmission spring unit KUFE in FIG. 5 has two separate force transmission springs, however. A first force transmission spring KUF1 is configured to pick up the drive force in a first operating mode (translation mode) of the closing body SK. A further (second) force transmission spring KUF2 is configured to pick up the drive force in a further (second) operating mode (tilting mode) of the closing body SK. Since the force transmission spring unit KUFE has two separate force transmission springs KUF1, KUF2, the anti-trap protection for the respective operating modes can be illustrated even more effectively, since each particular force transmission spring KUF1, KUF2 can be set optimally for the drive force acting in the particular operating mode.

With the closing device according to an aspect of the invention, it is possible, even in the case of a hard clamping body (spring rate of 65 N/mm) as prescribed in section S5 of FMVSS118, to reliably detect the trapping incident in the closing zone of the closing body SK. This is possible since the spring rate of the force transmission spring unit KUFE is lower than the closing system spring rate FRSLS of the closing system SLS. As a result of the use of the force transmission spring unit KUFE having a low force transmission spring rate, i.e. as a result of the use of a soft force transmission spring unit KUFE, the travel for detecting the trapped object EO can be lengthened, and so the trapped object EO can be detected more reliably and with greater security, even when a user is not in the vicinity of the vehicle FZ.

Since the spring rates of the individual mechanical components of the closing system SLS, viewed individually, are quite large and can also be subject to high tolerances or fluctuations, as a result of the installation of the additional force transmission spring unit KUFE, the overall spring rate FRGES and also the overall spring rate tolerance range TGES thereof can be noticeably reduced. As a result, the tolerances of the spring rates of the individual mechanical components of the closing system SLS have a much smaller influence on the overall spring rate FRGES. As a result, the picking up or determination, or measurement, of the force acting on the closing body SK (or clamping force) is easier, more correct and more reproducible.

The closing device SV according to an aspect of the invention also makes it possible for the overall spring rate tolerance range TGEL to be reduced in that the tolerance range of the remaining components of the closing system SLS, that is to say the closing system spring rate tolerance range TSLS, has an influence on the overall spring rate FRGES with lower weighting. In addition, the value of the overall spring rate FRGES is lower and virtually independent of the closing system spring rate FRSLS. This results in an increase in the allowed travel and in an increase in the allowed time for detecting the trapped object or the hazardous situation. As a result, the time required for detecting the trapped object EO and for initiating countermeasures is increased and the requirements for section S5 of FMVSS118 can be realized more easily.

At the same time, the requirements on the tolerance range of the closing system spring rate FRSLS of the closing system SLS can be expanded, since the overall spring rate tolerance range TGES and the overall spring rate FRGES of the closing device SV are defined predominantly by the additionally introduced force transmission spring unit KUFE, which preferably has a force transmission spring rate tolerance range TKUFE that is as small as possible.

The invention claimed is:

1. A closing device for opening and closing an opening in a vehicle, comprising:
a closing system, having:
a closing body that is fitted on the vehicle in a movable manner and is configured to open and close the opening,
a drive device that is operatively connected to the closing body and is configured to move the closing body, and
a transmission system that is arranged between the closing body and the drive device and is configured to transmit a drive force generated by the drive device to the closing body,
wherein the closing system has a closing system spring rate that characterizes an overall elasticity of the closing body, of the drive device and of the transmission system, and
a force transmission spring unit that is configured to pick up the drive force transmitted from the drive device to the closing body, wherein the force transmission spring unit has a force transmission spring rate that is lower than the closing system spring rate.

2. The closing device as claimed in claim 1, wherein the force transmission spring unit is arranged between the closing body and the transmission system.

3. The closing device as claimed in claim 1, also having a vehicle frame that has the opening to be opened and closed, wherein the force transmission spring unit is arranged between the vehicle frame and the closing body.

4. The closing device as claimed in claim 1, wherein the force transmission spring unit is connected in series with the closing body, the drive device, the transmission system and optionally the vehicle frame.

5. The closing device as claimed in claim 4, wherein the closing system spring rate has a closing system spring rate tolerance range and the force transmission spring rate has a force transmission spring rate tolerance range, and the force transmission spring rate tolerance range is selected such that, at a predetermined force transmission spring rate, the overall spring rate that results from the closing system spring rate and the force transmission spring rate has an overall spring rate tolerance range of no more than ±30%.

6. The closing device as claimed in claim 5, wherein the force transmission spring rate is selected such that an overall spring rate that results from the closing system spring rate and the force transmission spring rate is at most 20 N/mm.

7. The closing device as claimed in claim 4, wherein the force transmission spring rate is selected such that an overall spring rate that results from the closing system spring rate and the force transmission spring rate is at most 20 N/mm.

8. The closing device as claimed in claim 1, wherein the force transmission spring rate is less than 65 N/mm.

9. The closing device as claimed in claim 1, wherein the force transmission spring unit has a maximum linear elastic deformation at a force of 100 N plus a frictional force that arises in the closing system.

10. The closing device as claimed in claim 9, wherein the maximum linear elastic deformation occurs at a value of 60% to 80% of 100 N.

11. The closing device as claimed in claim 1, wherein the force transmission spring unit exhibits a metal material or a fiber composite material.

12. The closing device as claimed in claim 1, wherein the force transmission spring unit has a wire.

13. The closing device as claimed in claim 12, wherein the wire is coiled.

14. The closing device as claimed in claim 1, wherein the force transmission spring unit is configured to pick up the drive force both in a first force application direction and in a second force application direction that is at an angle to the first force application direction.

15. The closing device as claimed in claim 1, wherein the force transmission spring unit has a first force transmission spring that picks up the drive force in a first operating mode, and has a further force transmission spring that picks up the drive force in a further operating mode.

* * * * *